United States Patent Office 3,384,388
Patented May 21, 1968

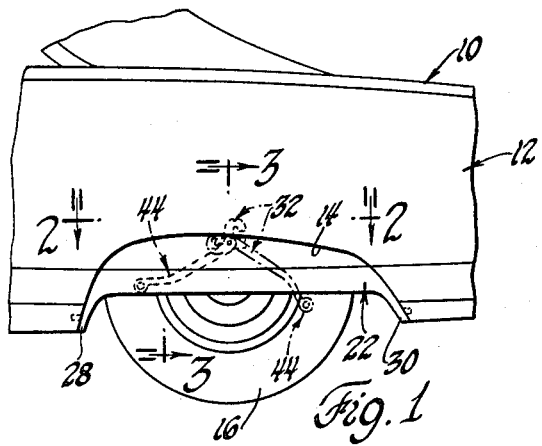
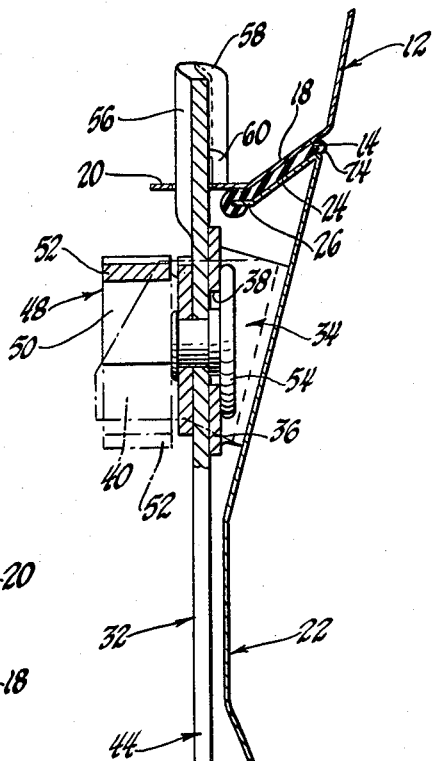
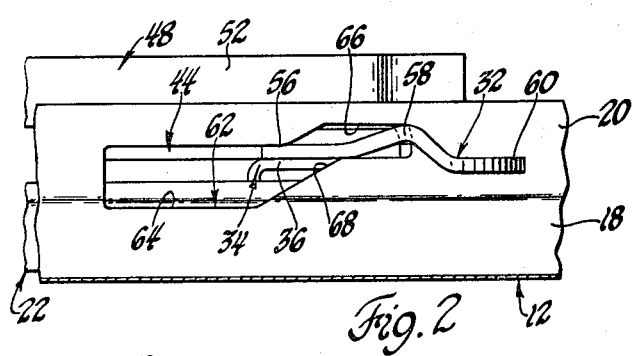
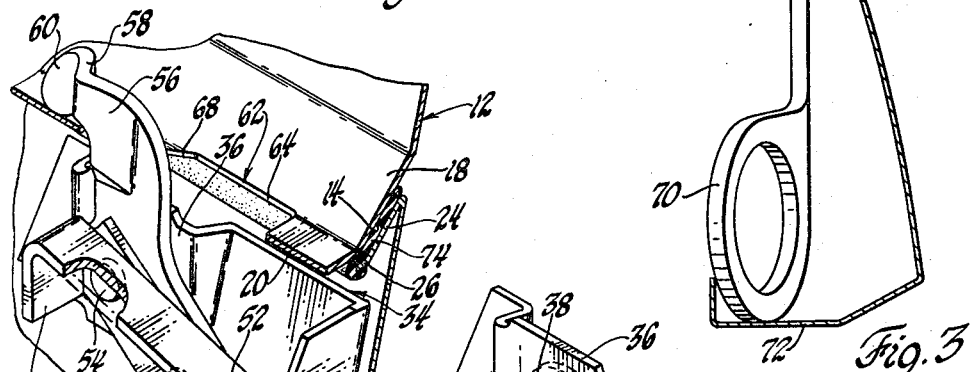
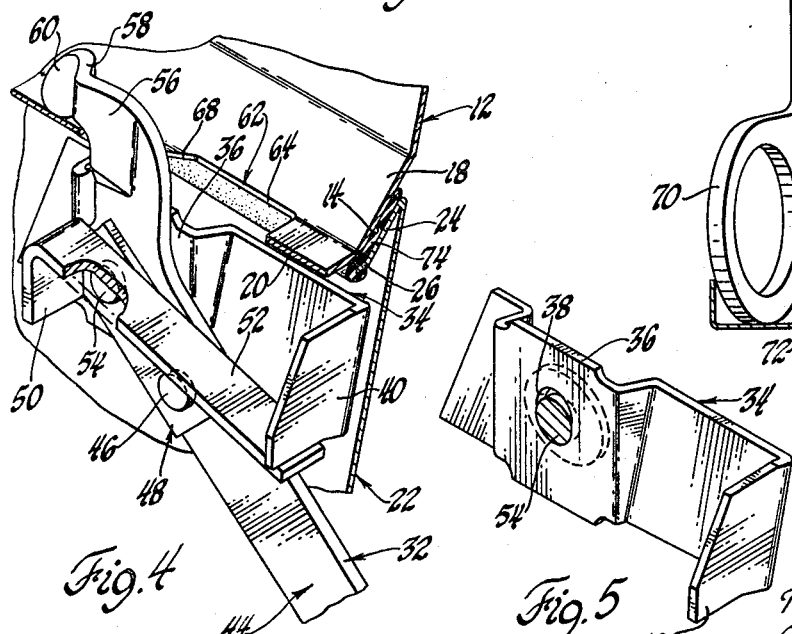
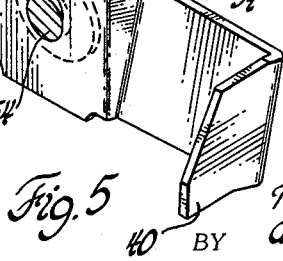

3,384,388
FENDER SKIRT
Peter M. Kobrehel, Warren, and Akira Tanaka, Southfield, Mich., assignors to General Motors Corporation, Detroit, Mich., a corporation of Delaware
Filed Feb. 10, 1966, Ser. No. 526,478
3 Claims. (Cl. 280—153)

ABSTRACT OF THE DISCLOSURE

A fender skirt includes a latch mounting bracket having an elongated slot. A hook-shaped latch member mounts a pin received in the slot to pivotally mount the latch member on the skirt and to also permit shifting movement of the latch member. A leaf spring is secured at one end to the latch member to one side of the pivot thereof and the other end of the latch member engages a lateral tab of the mounting bracket when the latch member is in latched position to exert a bias on the latch member shifting it downwardly relative to the skirt to hold the hook-shaped end in tight engagement with the body flange which defines the wheel opening receiving the skirt.

---

This invention relates to fender skirts and more particularly to latch means for a vehicle body fender skirt.

One feature of this invention is that it provides a fender skirt having improved latch means for latching the skirt to the body. Another feature of this invention is that the latch means includes a latch member mounted on the skirt for bodily movement relative thereto when in latched position and means operative in the latched position of the member exerting a bias tending to shift the member relative to the skirt and into engagement with the body. A further feature of this invention is that the latch member is pivotally and slidably mounted on the skirt and resilient means carried by the latch member are operatively connected to the skirt only in the latched position of the latch member. Yet another feature of this invention is that the resilient means includes a spring arm carried by the latch member and fulcrumed on the skirt in the latched position of the latch member.

These and other features of the fender skirt of this invention will be readily apparent from the following specification and drawings wherein:

FIGURE 1 is a partial side elevational view of a vehicle body embodying a fender skirt according to this invention;

FIGURE 2 is an enlarged view taken generally along the plane indicated by line 2—2 of FIGURE 1;

FIGURE 3 is an enlarged sectional view taken generally along the plane indicated by line 3—3 of FIGURE 1;

FIGURE 4 is an enlarged perspective view of the latch means; and

FIGURE 5 is a perspective view of a portion of FIGURE 4.

Referring now particularly to FIGURE 1 of the drawings, a vehicle body designated generally 10 includes a body outer panel or quarter panel 12 which is provided with a wheel opening 14 to provide access to one of the rear wheels 16 of the body. As can be seen in FIGURES 3 and 4, the opening 14 is defined by generally inwardly extending flanges 18 and 20 of the panel 12. In order to close a portion of the opening 14, the body 10 is provided with a wheel opening cover or fender skirt 22. The cover 22 includes an outer inwardly extending flange 24 and an inner inwardly extending flange 26 which are respectively located in generally parallel spaced relationship to the flanges 18 and 20 of the panel 12. Suitable mounting means such as interfitting brackets are provided between the front and rear corners 28 and 30 of the cover and the adjacent body structure in order to mount the cover 22 on the body 10 within the opening 14. In order to secure the cover 22 in place, a latch means 32 according to this invention is provided.

As best shown in FIGURES 4 and 5, a bracket 34 is welded to the inner surface of the cover 22 adjacent the upper edge portion thereof and is provided with a generally centrally disposed offset portion 36 provided with an elongated generally vertically disposed slot 38. Bracket 34 also includes a lateral tab or flange 40 at one end thereof.

A latch member designated generally 44 has riveted thereto at 46 a spring member designated generally 48. The member 48 includes a lateral flange 50 at one end thereof and a cantilever spring arm 52 extends from the flange 50 generally at right angles to the member 48. A rivet 54, FIGURE 3, is secured to the spring member 48 and the latch member 44 and a shoulder portion thereof is received within the elongated slot 38 of the bracket 34 to pivotally and slidably mount both the latch arm and the spring member 48 on the skirt. The free end portion of the cantilever spring arm 52 slidably engages the lower edge of the flange 40 of bracket 34 to bias the latch member 44 downwardly with respect to bracket 34 and normally locate the shoulder portion of the rivet 54 adjacent the lower end of the slot 38.

The latch member 44 further includes an upper, generally hook shaped end having a shank portion 56, an offset portion 58, and a terminal offset portion 60.

As best shown in FIGURE 2, the flanges 18 and 20 of the body panel 12 are provided with a slot designated generally 62 and having an outer portion 64 and an inner portion 66 of less width and joined to the outer portion by an angled interconnecting portion 68.

When the skirt 22 is located within the opening 14 and the latch member 44 is in latched position as shown in the drawings, the portion 60 of the latch member engages the flange 20 of the body panel 12 under the resilient bias of the spring arm 52 of the spring 48. The latch member is held in this position against rotation by springing the lower apertured end portion 70 thereof into engagement with the lower flange 72 of the cover 22. The shank portion 56 of the latch member extends across slot portion 62 and engages the inner edge of slot portion 64 and the outer edge of slot portion 66. Shank portion 56 is thus trapped between these edges and thereby cams the skirt 22 inwardly of the body to hold a resilient sealing member 74 on the flange 26 in sealing engagement with the flange 18 as shown in FIGURES 3 and 4.

When it is desired to demount the skirt 22 from the body, the portion 70 of the latch member is grasped and sprung up and over the flange 72 of the skirt. Thereafter, the latch member is rotated clockwise as viewed in FIGURE 4 to move the shank portion 56 thereof out of engagement with the outer edge of the slot portion 66 and to swing the portions 58 and 60 through the slot portion 64 so that the cover can thereafter be removed by disengaging the front and rear mounting means 28 and 30.

When the latch member 44 is rotated clockwise to its unlatched position, the spring arm 52 moves out of engagement with the flange 40 so that the spring member 48 no longer exerts any bias on the latch member. It can thus be seen that the spring member is operative only in the latched position of the latch member to exert a resilient bias on this member tending to shift the member downwardly of the skirt and move the offset portion 60 thereof into engagement with the flange 20 of the body panel 12.

The spring arm 52 of the spring member 48 acts as a tolerance takeup to permit the latch member to shift upwardly or downwardly as required by the engagement of portion 60 with flange 20 or engagement of portion 70 with flange 72.

Thus, this invention provides an improved fender skirt.

We claim:

1. In combination with a vehicle body having a wheel opening therein, a skirt for closing the opening and including a latch support member, a latch member, a pin on one member received in a slot in the other member to mount the latch member on the support member for pivotal movement between latched and unlatched positions and bodily shifting movement in each position, and resilient means interconnecting the latch member and the support member in latched position and exerting a bias on the latch member tending to bodily shift the latch member relative to the support member in a direction tending to hold the latch member in tight engagement with the body and mount the skirt within the opening.

2. The combination recited in claim 1 wherein the resilient means includes a leaf spring secured to one member to one side of the latch member pivot and engaging the other member to the other side of the latch member pivot when the latch member is in latched position.

3. The combination recited in claim 1 wherein the resilient means include a leaf spring having one end thereof secured to the latch member to one side of the pivot thereof on the latch support member and being fulcrumed on the latch support member to the other side of the pivot of the latch member when the latch member is in latched position.

References Cited

UNITED STATES PATENTS

| 2,062,597 | 12/1936 | Moore | 280—153 |
| 2,607,612 | 8/1952 | Schatzman | 280—153 |
| 2,634,138 | 4/1953 | Zabel | 280—153 |
| 2,742,303 | 4/1956 | Bookman | 280—153 |

BENJAMIN HERSH, *Primary Examiner.*

PHILIP GOODMAN, *Examiner.*